(12) United States Patent
Masatomi et al.

(10) Patent No.: US 7,795,360 B2
(45) Date of Patent: Sep. 14, 2010

(54) COATING COMPOSITION

(75) Inventors: Toru Masatomi, Chiba Prefecture (JP);
Motoshi Sasaki, Chiba Prefecture (JP);
Hideki Kobayashi, Chiba Prefecture (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 807 days.

(21) Appl. No.: 10/562,656

(22) PCT Filed: Jun. 25, 2004

(86) PCT No.: PCT/JP2004/009403
§ 371 (c)(1),
(2), (4) Date: Nov. 24, 2006

(87) PCT Pub. No.: WO2005/000981
PCT Pub. Date: Jan. 6, 2005

(65) Prior Publication Data
US 2007/0167559 A1    Jul. 19, 2007

(30) Foreign Application Priority Data
Jun. 27, 2003   (JP)   ............... 2003-183831

(51) Int. Cl.
*C08F 30/08*    (2006.01)
(52) U.S. Cl. .................. 526/279; 528/17
(58) Field of Classification Search ............ 526/279; 528/17
See application file for complete search history.

(56) References Cited

U.S. PATENT DOCUMENTS 4,988,788 A    1/1991   Takarada

FOREIGN PATENT DOCUMENTS

| EP | 0656409 A1 | 6/1995 |
|---|---|---|
| JP | 63168469 | 7/1988 |
| JP | 2064110 | 3/1990 |
| JP | 3024148 | 2/1991 |
| JP | 3252414 | 11/1991 |
| JP | 4103668 | 4/1992 |
| JP | 6172473 | 6/1994 |
| JP | 7150105 | 6/1995 |
| JP | 10101765 | 4/1998 |

OTHER PUBLICATIONS

English language Abstract for JP2064110 extracted from espacenet.com database dated Dec. 5, 2005.
English language Abstract for JP3024148 extracted from espacenet.com database dated Dec. 5, 2005.
English language Abstract for JP3252414 extracted from espacenet.com database dated Dec. 5, 2005.
English language Abstract for JP4103668 extracted from espacenet.com database dated Dec. 5, 2005.
English language Abstract for JP6172473 extracted from espacenet.com database dated Dec. 5, 2005.
English language Abstract for JP7150105 extracted from espacenet.com database dated Dec. 5, 2005.
English language Abstract for JP10101765 extracted from espacenet.com database dated Dec. 5, 2005.
English language Abstract for JP63168469 extracted from espacenet.com database dated Dec. 5, 2005.

*Primary Examiner*—Kuo-Liang Peng
(74) *Attorney, Agent, or Firm*—Howard & Howard Attorneys PLLC

(57) ABSTRACT

A coating agent composition of the present invention consists of: (A) an acrylic-type copolymer that has a weight-average molecular weight within the range of 3,000 to 100,000 and contains in its side molecular chains hydrolysable silyl groups of the following formula: $-COO-Q-SiR^2{}_n(OR^3)_{3-n}$ and organosiloxysilyl groups of the following formula: $-COO-Q-Si(OSiR^4{}_3)_3$; and (B) a condensation-reaction accelerating catalyst. Prior to curing, the composition demonstrates excellent storage stability and coating properties, while after curing the composition produces a coating film of high hardness that has excellent water-repellent properties and durability.

21 Claims, No Drawings

COATING COMPOSITION

RELATED APPLICATIONS

This application claims priority to and all the advantages of International Application No. PCT/JP2004/009403, filed on Jun. 25, 2004, which claims priority to Japanese Patent Application No. JP2003-183831, filed on Jun. 27, 2003.

FIELD OF THE INVENTION

The invention relates to a coating agent composition and more specifically to a coating agent composition that prior to curing possesses excellent coatability and after curing forms a water-repellent and highly durable coating film of high hardness.

BACKGROUND OF THE INVENTION

Coating compositions based on acrylic resins are used as coating agents for coating external panels of various structural elements utilized in the construction industry. However, the aforementioned coating is not sufficiently reliable with regard to water repellency, durability, and tightness of adhesion to the panels. Many attempts have been undertaken heretofore for overcoming the aforementioned disadvantages. For example, Japanese Unexamined Patent Application Publication (hereinafter referred to as Kokai) H2-64110 and Kokai H3-24148 describe curable compositions having an acryl-type copolymer with hydrolysable silyl groups as their main component; Kokai H3-252414 describes a composition that contains an acryl-type polymer with hydrolysable silyl group, an organopolysiloxane with silanol groups, and a condensation-reaction catalyst; and Kokai H7-150105 (equivalent to EP0656409) describes a composition that contains an acryl-type polymer with hydroxyl and hydrolysable silyl groups, an organopolysiloxane with silanol groups, and a condensation-reaction acceleration catalyst. However, all the aforementioned coating compositions suffer from such problems as insufficient water repellency and low endurance.

Japanese Official Patent Publication H3-69950 (equivalent to U.S. Pat. No. 4,988,788) discloses a room-temperature-curable coating composition that is formed from a siloxane-containing acrylic-type copolymer obtained by copolymerizing an alkylmethacrylate, low-molecular siloxane methacrylate, and a silane compound with hydrolysable functional groups and radical-polymerizable unsaturated groups. However, a coating film produced from the aforementioned room-temperature-curable coating composition demonstrates either low water-repellency because of an insufficient amount of siloxane units in the low-molecular siloxane methacrylate, or undesired softness and low durability because the aforementioned low-molecular siloxane methacrylate contains dialkylsiloxane units. Since the low-molecular siloxane methacrylate is produced by hydrosilation with the use of a platinum catalyst, the residual platinum catalyst left in the obtained room-temperature-curable coating composition may cause discoloration of the final coating.

DISCLOSURE OF THE INVENTION

The applicants have conducted a thorough study that led them to the present invention. More specifically, it is an object of the present invention to provide a coating composition that prior to curing demonstrates excellent coatability and after curing forms a water-repellent and highly durable coating film of high hardness.

The invention relates to a coating agent composition comprising:

(A) 100 parts by weight of an acrylic-type copolymer that has a weight-average molecular weight within the range of 3,000 to 100,000 and is obtained by radical-polymerization of the following constituents:

(A1) 100 parts by weight of a silane compound represented by the following general formula (1):

$$CH_2=C(R^1)-COO-Q-SiR^2_n(OR^3)_{3-n} \quad (1)$$

(where $R^1$ is a hydrogen atom or a methyl group, Q is a bivalent aliphatic hydrocarbon group with 2 to 6 carbon atoms, $R^2$ is a non-substituted or substituted univalent hydrocarbon group having 1 to 8 carbon atoms, $R^3$ is an aliphatic hydrocarbon group having 1 to 4 carbon atoms, and n is an integer from 0 to 2);

(A2) 80 to 250 parts by weight of one or more types of vinyl-polymerizable compounds with unsaturated bonds selected from an acrylic-type compound (except for constituent (A1)), a vinyl-type compound, and styrene-type compound;

(A3) 10 to 50 parts by weight of a siloxysilane compound represented by the following general formula (2):

$$CH_2=C(R^1)-COO-Q-Si(OSiR^4_3)_3 \quad (2)$$

(where $R^1$ and Q are the same as defined above, and $R^4$ is an alkyl group with 1 to 4 carbon atoms); and (B) a catalytic quantity of a condensation-reaction accelerating catalyst.

Preferred Embodiments of the Present Invention

Component (A), which is a main component of the coating agent of the invention, is an acrylic-type copolymer obtained by copolymerizing constituents (A1) to (A3).

Component (A1) is represented by the following general formula (1):

$$CH_2=C(R^1)-COO-Q-SiR^2_n(OR^3)_{3-n} \quad (1)$$

(where $R^1$ is a hydrogen atom or a methyl group, Q is a bivalent aliphatic hydrocarbon group with 2 to 6 carbon atoms, such as an ethylene group, propylene group, butylene group, or a similar alkylene group. In the above formula, $R^2$ designates a non-substituted or substituted univalent hydrocarbon group having 1 to 8 carbon atoms, such as a methyl group, ethyl group, propyl group, butyl group, or a similar alkyl group; and a phenyl group or a similar aryl group. $R^3$ designates an aliphatic hydrocarbon group having 1 to 4 carbon atoms, such as a methyl group, ethyl group, propyl group, butyl group, or a similar alkyl group; and a propenyl group, butenyl group, or a similar alkenyl group. n is an integer from 0 to 2, preferably 0 or 1. The aforementioned constituent (A1) can be exemplified by 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, 3-methacryloxypropylmethyldiethoxysilane, 3-methacryloxypropyl tri(isopropoxy) silane, and 3-acryloxypropyl tri (isopropoxy) silane.

The acrylic compound of constituent (A2) may be represented by ester acrylates and ester methacrylates, such as methylmethacrylate, methylacrylate, ethylmethacrylate, ethylacrylate, butylmethacrylate, butylacrylate, 2-(dimethylamino) ethylmethacrylate, 2-(dimethylamino) ethylacrylate, 3-(dimethyllamino) propylmethacrylate, 3(dimethylamino)

propylacrylate, 2-(diethylamino) ethylmethacrylate, and 2-(diethylamino) ethylacrylate with alkylmethacrylate and, especially methylmethacrylate being preferable. Vinyl type compounds can be represented by vinyl acetate, methylvinylether, ethylvinylether, methylvinylketone, and ethylvinylketone. The vinyl acetate is preferable. Styrene-type compounds can be represented by styrene, α-methylstyrene, and p-methylstyrene. Constituent (A2) may be comprised of the aforementioned compounds used individually or in combinations of two or more.

Constituent (A3) is represented by the following general formula (2):

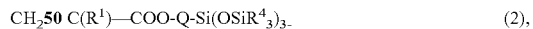

where $R^1$ and Q are the same as defined above, and $R^4$ is an alkyl group with 1 to 4 carbon atoms, such as a methyl group, ethyl group, propyl group, or butyl group. The aforementioned constituent (A3) may be comprised of a tris (trialkylsiloxy) silane compounds represented by the following formulae, where Me stands for a methyl group, Et stands for an ethyl group, and Pr stands for a propyl group:

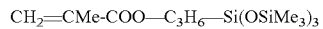

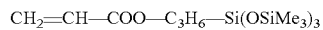

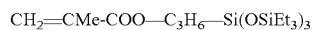

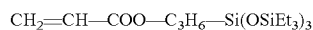

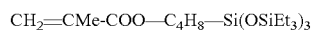

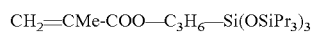

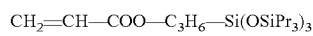

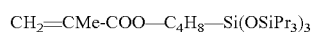

There are no special restrictions with regard to a method for the preparation of constituent (A3), but one of the following methods can be recommended: a method based on a reaction between tris (trialkylsiloxy) silane and allylacrylate or allylmethacrylate in the presence of a platinum catalyst; and the method disclosed in Kokai H11-217389 based on a reaction between methacryloxyalkyltrialkoxysilane and hexaalkyldisiloxane in the presence of a carboxylic acid and acidic catalyst. The method based on the reaction between methacryloxyalkyltrialkoxysilane and hexaalkyldisiloxane in the presence of a carboxylic acid and acidic catalyst is preferable, since in the case of the reaction with a platinum catalyst, residual platinum that remains in the monomer may adversely affect on physical properties and storage stability of the final product.

Regarding the amounts in which constituents (A1) to (A3) are used, constituent (A2) should be used in the amount of 80 to 250 parts by weight, preferably 80 to 150 parts by weight, and constituent (A3) should be used in the amount of 10 to 50 parts by weight, preferably 10 to 40 parts by weight, per 100 parts by weight of constituent (A1). If constituent (A2) is used in the amount exceeding 250 parts by weight, the share of constituent (A1) will be too low, and this will impair curability of the composition. On the other hand, if constituent (A3) is used in an amount of less than 10 parts by weight, a cured coating film produced from the composition will have insufficient water-repellency. In case constituent (A3) is used in the amount exceeding 50 parts by weight, the coating film will have low hardness and endurance.

Component (A) is produced by radically copolymerizing aforementioned constituents (A1) to (A3). If copolymerization is carried out using 0.30 to 0.99 mole of an azo compounds per 100 moles of the total sum of the aforementioned constituents, it will be possible to synthesize with high efficiency an acrylic-type copolymer having a weight-average molecular weight within the range of 3,000 to 100,000. If the azo compound is used in an amount of less than 0.30 mole, the weight-molecular-weight of the acrylic-type copolymer will exceed 100,000, and this will impair storage stability of component A. If, on the other hand, the azo compound is used in an amount exceeding 0.99 mole, the weight-molecular-weight of the acrylic-type copolymer will become below 3,000, and this will impair a property of the composition such as coatability. By using the azo compound in aforementioned specific quantities, it will become possible to control the molecular weight of component (A) and to obtain a coating composition with excellent properties of coatability and storage stability. The following are specific examples of the azo compounds: 2,2'-azobis-2-methylbutylonitrile, 2,2'-azobis-2,4-dimethylvaleronitrile, 2,2'-azobis-cyclohexanecarbonitrile, or other azo compounds, except for 2,2-azobis-isobutylonitrile. In addition to the azo compounds, the process can also be carried out with an addition of such radical-polymerization catalysts as benzoyl peroxide, lauroyl peroxide, or similar organic peroxides. Component (A) can be prepared, e.g., by copolymerizing constituents (A1) to (A3) in the atmosphere of an inert gas with the use of an azo compound in an organic solvent of the below-described component (C). Component (A) may be comprised of an acrylic-type copolymer that contains in its side molecular chain groups with hydrolysable silyl groups of formula —COO-Q-SiR$^2_n$(OR$^3$)$_{3-n}$ derived from constituent (A1) and groups that contain organosiloxysilyl groups of formula —COO-Q-Si(OSiR$^4_3$)$_3$ derived from constituent (A3). Such component (A) may have a weight-average molecular weight within the range of 3,000 to 100,000, preferably within the range of 5,000 to 80,000.

A condensation-reaction accelerating catalyst of component (B) provides condensation and cross-linking of alkenyloxysilyl groups and alkoxysilyl groups contained in component (A). The following are specific examples of compounds suitable for use as component (B): dibutyltin dilaurate, dibutyltin dimaleate, dioctyltin dilaurate, dioctyltin dimaleate, tin octylate, or a similar organotin compound; isopropyltriisostearoyl titanate, isopropyl tris-(dioctylpyrophosphate) titanate, bis-(dioctylpyrophosphate)oxyacetate titanate, tetraalkyl titanate, or similar organotitanium compounds; tetrabutyl zirconate, tetrakis (acetylacetonate) zirconium, tetraisobutyl zirconate, butoxy-tris (acetylacetonate) zirconium, or similar organozirconium compounds; tris (ethylacetoacetate) aluminum, tris (acetylacetonate) aluminum, or a similar organoaluminum compound. Component (B) should be used in catalytic amounts. Normally, this is 0.1 to 8 parts by weight per 100 parts of component (A).

The coating composition of the invention consists mainly of components (A) and (B), but in addition to the aforementioned components the composition may contain an organic solvent (C). There are no special restrictions with regard to the solvent, provided that it can dissolve constituents (A1) to (A3) and component (A) [as a whole]. Such a solvent may be exemplified by toluene, xylene, or similar aromatic hydrocarbons; methanol, ethanol, isopropanol, butanol, isobutanol, or similar alcohols; ethyl acetate, butyl acetate, isobutyl acetate, or similar esters; or combinations of the aforementioned solvents. Solvent (C) should be used in an amount sufficient for dissolving component (A), which is normally within the range of 100 to 1900 parts by weight per 100 parts by weight of component (A). It is recommended to keep the non-volatile fraction of the composition within the range of 5 to 50 wt. %. At room temperature, component (A) is liquid, and if it is suitable for coating, it can be used without component (C).

In addition to components (A) and (B), or (A), (B), and (C), for improving adhesive properties, the coating composition of the invention may be combined with an aminosilane coupling agent (D), such as 3-aminopropyltriethoxysilane, 3-aminosilanetrimethoxysilane, 3-aminopropylmethyldiethoxysilane, 3-aminopropylmethyldimethoxysilane, 3-(2-aminoethyl) aminopropyltrimethoxysilane, 3-(aminoethyl) aminopropylmethyldimethoxysilane, and 3-anilinopropyltrimethoxysilane. Component (D) can be used in the amount of 0.1 to 10 parts by weight per 100 parts by weight of component (A).

If necessary, the coating composition of the invention can be additionally combined with a dehydration agent, leveling agent, thickener, ultraviolet-ray absorbent, or other additives. A dehydration agent can be represented by a methyl orthoformate, ethyl orthoformate, methyl orthoacetate, ethyl orthoacetate, etc. A leveling agent may be represented by various polyether-modified silicone oils. For use as a coating material, the composition of the invention may also include various pigments, dyes, or other coloring agents, carbon black, charge controlling agents, aluminum paste, talc, glass fiber, metal powder, etc.

Following the application on a substrate, the composition is held at room temperature or heated for curing and forming a coating film. The composition may be applied onto a substrate by brushing, spraying, dipping, flow coating, knife coating, spin coating, or by any other method known in the art. The thickness of a coating film is optional but preferably should be within the range of 0.1 to 50 µm. In case the composition is combined with pigments as coloring agents, the film thickness should be within the range of 5 to 100 µm. Substrates suitable for use in conjunction with the composition of the invention may be exemplified by iron, stainless steel, aluminum, alumite, duralumin, or other metals; ferrite, alumina, zinc oxide, or other metal oxides; mortar, slate, concrete, glass, ceramic, or other inorganic substrates; wood, composite sheets; thermosetting resin, thermoplastic resin, fiber-reinforced plastic, or other resins. Substrates may be in the form of plates, blocks, coating films, or powders. In view of its high adhesive properties, the coating agent of the invention is suitable for coating fine metal powders, fine metal oxide powders, and fine magnetic powders.

As has been shown above, one of the main components of the coating composition of the invention is an acrylic-type copolymer that has a weight-average molecular weight of no more than 100,000 and contains in its side chain tris (trialkoxysiloxy) silyl groups and alkoxysilyl groups with hydrolysable groups. Provision of the aforementioned groups imparts to the composition an advantage in that, due to the action of component (B), it becomes possible to facilitate condensation and cross linking, improve coatability even with the use of a small amount of an organic solvent, and obtain a uniform coating. Furthermore, curing of the composition produces a transparent coating film that is characterized by excellent water-repellency, durability, hardness, and tight adhesion to various substrates. The composition may be used as a coating agent for metal substrate, inorganic substrates, etc., and is especially advantageous for surface coating of powdered materials, such as fine metal powders, fine metal-oxide powders, and fine magnetic powders.

PRACTICAL EXAMPLES

The invention will be further described with reference to practical examples. In these examples, (%) means (weight %). Values of the weight-average molecular weight were determined with the use of gel-permeation chromatography and are referenced to polystyrene as standard. Viscosity at 25° C. was measured in accordance with JIS-K2283. A non-volatile fraction was measured by weighing 1 g of the coating composition on an aluminum plate, measuring the weight after 1 hour heating at 150° C., and then calculating the content of the non-volatile fraction by means of the following formula:

Non-volatile fraction (%)=[(weight prior to heating)−(weight after heating)]×100/(weight prior to heating)

Pencil hardness was measured according to JIS-K5400. Contact angle with water was measured by means of a contact-angle meter (manufactured by Kyowa Kaimen Kagaku Co., Ltd.).

Reference Example 1

Preparation of 3-methacryloxypropyl tris (trimethylsiloxy) silane

A flask equipped with a stirrer was loaded with 38.7 g of hexamethyldisiloxane, 0.05 g of trifluoromethane sulfonic acid, and 28.6 g of acetic acid, and the mixture was heated to 50° C. Following this, 26.3 g of 3-methacryloxypropyltrimethoxysilane was then added dropwise, and a reaction was conducted for 2 hours. The reaction was continued to completion after the reaction product was washed with water twice, reheated to 60° C., and combined with 0.016 g of trifluoroacetic acid and 6.32 g of hexamethyldisiloxane. The obtained product was washed with water twice and the and the target product was received after stripping the residual hexamethyl disiloxane, acetic acid, and other low-boiling-point substances by treating the product for 2 hours at a temperature of 100° C. and pressure of 10 Torr.

Synthesis Example 1

A flask equipped with a stirrer was loaded with 70 g of toluene, and the contents were heated to 90° C. in a flow of gaseous nitrogen. Following this, a mixture composed of the following components was added dropwise during 1 hour: 21 g (210 millimoles) of methylmethacrylate, 21 g (85 millimoles) of 3-methacryloxypropyltrimethoxysilane, 4.2 g (10 millimoles) of 3-methacryloxypropyl tris (trimethylsiloxy) silane prepared in Reference Example 1 and expressed by the following formula: $CH_2=CMe-COO-C_3H_6-Si\ (OSiMe_3)_3$ (where Me is a methyl group), and 0.18 g of 2,2'-azobis-2-methylbutyronitrile. Upon completion of the addition operation, the solution obtained by dissolving 0.02 g of 2,2'-azobis-2-methylbutyronitrile in 5 g of toluene was added (so that the total amount of 2,2'-azobis-2-methylbutyronitrile became equal to 0.2 g=1 millimole), the components were mixed for 3 hours at 90 to 100° C., and a radical-polymerization reaction was conducted. The obtained methacrylic-type copolymer had a weight-average molecular weight equal to 26,000. Methanol was then added in the amount of 10 g, and the obtained solution was diluted with toluene until the concentration of the non-volatile fraction in the obtained copolymer solution became equal to 20 wt. %. Viscosity of the aforementioned copolymer solution was 8 mm²/s, the index of refraction was 1.49, and specific gravity was 0.91. Observation of the obtained methanol copolymer solution after 3-month storage at room temperature did not reveal any changes in the appearance.

Synthesis Example 2

A flask equipped with a stirrer was loaded with 35 g of toluene, and the contents were heated to 90° C. in a flow of gaseous nitrogen. Following this, a mixture composed of the following components was added dropwise during 1 hour: 8.6 g (86 millimoles) of methylmethacrylate, 8.2 g (33 millimoles) of 3-methacryloxypropyltrimethoxysilane, 1.6 g (3.8 millimoles) of 3-methacryloxypropyl tris (trimethylsiloxy) silane prepared in Reference Example 1 and expressed by the following formula: $CH_2=CMe-COO-C_3H_6-Si(OSiMe_3)_3$ (where Me is a methyl group), 4.8 g (31 millimoles) of 2-(dimethylamino) ethylmethacrylate, and 0.14 g of 2,2'-azobis-2-methylbutyronitrile. Upon completion of the addition operation, the solution obtained by dissolving 0.01 g of 2,2'-azobis-2-methylbutyronitrile in 5 g of toluene was added (so that the total amount of 2,2'-azobis-2-methylbutyronitrile became equal to 0.15 g=0.78 millimole), the components were mixed for 3 hours at 90 to 100° C., and a radical-polymerization reaction was conducted. The obtained methacrylic-type copolymer had a weight-average molecular weight equal to 20,000. Methanol was then added in the amount of 5 g, and the obtained solution was diluted with toluene until concentration of the non-volatile fraction in the obtained copolymer solution became equal to 20 wt. %. Viscosity of the aforementioned copolymer solution was 10.8 mm²/s, an index of refraction was 1.487, and specific gravity was 0.92. Observation of the obtained methanol copolymer solution after 3-month storage at room temperature did not reveal any changes in the appearance.

Synthesis Example 3

A flask equipped with a stirrer was loaded with 70 g of toluene, and the contents were heated to 90° C. in a flow of gaseous nitrogen. Following this, a mixture composed of the following components was added dropwise during 1 hour: 21 g (210 millimoles) of methylmethacrylate, 4 g (38 millimoles) of styrene, 21 g (85 millimoles) of 3-methacryloxypropyltrimethoxysilane, 4.2 g (10 millimoles) of 3-methacryloxypropyl tris (trimethylsiloxy) silane prepared in Reference Example 1 and expressed by the following formula: $CH_2=CMe-COO-C_3H_6-Si(OSiMe_3)_3$ (where Me is a methyl group), and 0.18 g of 2,2'-azobis-2-methylbutyronitrile. Upon completion of the addition operation, the solution obtained by dissolving 0.02 g of 2,2'-azobis-2-methylbutyronitrile in 5 g of toluene was added (so that the total amount of 2,2'-azobis-2-methylbutyronitrile became equal to 0.2 g=1 millimole), the components were mixed for 3 hours at 90 to 100° C., and a radical-polymerization reaction was conducted. The obtained methacrylic-type copolymer had a weight-average molecular weight equal to 27,000. Methanol was then added in the amount of 10 g, and the obtained solution was diluted with toluene until the concentration of the non-volatile fraction in the obtained copolymer solution became equal to 20 wt. %. Viscosity of the aforementioned copolymer solution was 8 mm²/s, the index of refraction was 1.49, and specific gravity was 0.91. Observation of the obtained methanol copolymer solution after 3-month storage at room temperature did not reveal any changes in the appearance.

Practical Example 1

A coating agent composition was prepare by mixing 30 g of toluene, 0.3 g of tetrabutyltitanate, and 70 g of the methacryl-type copolymer solution (20% non-volatile fraction) obtained in Synthesis Example 1. The obtained coating agent composition was applied onto a stainless-steel substrate, and the unit was heated for 1 hour at 200° C. to form a cured transparent coating film. The obtained coating film was uniform and free of ripples. The pencil hardness of the coating was 5 H, and contact angle with water was 90 °.

Almost no defects were found on the surface of the coating film after 10 scratches with No. 0000 Bonstar Steel Wool of Nippon Steel Wool Co., Ltd.

Practical Example 2

A coating agent composition was prepared in the same manner as in Practical Example 1, with the exception that 0.4 g of dibutyltinlaurate was used instead of 0.3 g of tetrabutyltitanate. The obtained composition was spread over the surface of a stainless-steel plate, and the unit was heated for 30 min. at 200° C. to form a cured transparent coating film. The obtained coating film was uniform and free of ripples. The pencil hardness of the coating was 5 H, and contact angle with water was 90°. Almost no defects were found on the surface of the coating film after 10 scratches with No. 0000 Bonstar Steel Wool of Nippon Steel Wool Co., Ltd.

Practical Example 3

A coating agent composition was prepare by mixing 20 g of toluene, 0.3 g of tetrabutyltitanate, 0.2 g of 3-(2-aminoethyl) aminopropyltrimethoxysilane, and 80 g of the methacryl-type copolymer solution (20% non-volatile fraction) obtained in Synthesis Example 1. The obtained coating agent composition was applied by flow coating onto the surface of a stainless-steel substrate, and the unit was heated for 1 hour at 200° C. to form a cured transparent coating film. The obtained coating film was uniform and free of ripples. The pencil hardness of the coating was 5 H, and contact angle with water was 90°. Almost no defects were found on the surface of the coating film after 10 scratches with No. 0000 Bonstar Steel Wool of Nippon Steel Wool Co., Ltd.

Practical Example 4

A coating agent composition was prepare by mixing 30 g of toluene, 0.3 g of tetrabutyltitanate, and 70 g of the methacryl-type copolymer solution (20% non-volatile fraction) obtained in Synthesis Example 2. The obtained coating agent composition was applied by flow coating onto the surface of a stainless-steel substrate, and the unit was heated for 1 hour at 200° C. to form a cured transparent coating film. The obtained coating film was uniform and free of ripples. The pencil hardness of the coating was 6 H, and contact angle with water was 90°. Almost no defects were found on the surface of the coating film after 10 scratches with No. 0000 Bonstar Steel Wool of Nippon Steel Wool Co., Ltd.

Practical Example 5

A coating agent composition was prepare by mixing 30 g of toluene, 0.3 g of tetrabutyltitanate, and 70 g of the methacryl-type copolymer solution (20% non-volatile fraction) obtained in Synthesis Example 3. The obtained coating agent composition was applied by flow coating onto the surface of a stainless-steel substrate, and the unit was heated for 1 hour at 200° C. to form a cured transparent coating film. The obtained coating film was uniform and free of ripples. The pencil hardness of the coating was 5 H, and contact angle with water was 90°. Almost no defects were found on the surface of the coating film after 10 scratches with No. 0000 Bonstar Steel Wool of Nippon Steel Wool Co., Ltd.

Comparative Example 1

A flask equipped with a stirrer was loaded with 106 g of toluene, and the contents were heated to 95° C. Following this, a mixture composed of 58 g of methylmethacrylate, 25 g of 3-methacryloxypropyltrimethoxysilane, and 0.9 g of 2,2'-azobis-2-methylbutyronitrile was added dropwise during 1 hour with the use of a dropping finnel. When the addition operation was completed, a mixed solution consisting of 0.1 g of 2,2'-azobis-2-methylbutyronitrile and 10 g of toluene was added dropwise, the components were mixed for 3 hours at 95° C. and radical-copolymerized to produce a methacrylic-type copolymer. The obtained solution was diluted with about 200 g of toluene so that The concentration of the non-volatile fraction in the obtained copolymer solution became equal to 20 wt. %. Viscosity of the aforementioned copolymer solution at 25° C. was 5 mm$^2$/s, and specific gravity was 0.91.

A coating agent composition was prepare by mixing 20 g of toluene, 0.3 g of tetrabutyltitanate, 0.2 g of 3-(2-aminoethyl) aminopropyltrimethoxysilane, and 80 g of the aforementioned methacryl-type copolymer solution (20% non-volatile fraction). The obtained coating agent composition was applied by flow coating onto the surface of a stainless-steel substrate, and the unit was heated for 30 min. at 180° C. to form a cured transparent coating film. Contact angle of the obtained coating film with water was 80°, and the film had unsatisfactory water repellency.

Comparative Example 2

A flask equipped with a stirrer was loaded with 70 g of toluene, and the contents were heated to 90° C. in a flow of gaseous nitrogen. Following this, a mixture composed of 21 g (210 millimoles) of methylmethacrylate, 21 g (85 millimoles) of 3-methacryloxypropyltrimethoxysilane, 4.2 g (10 millimoles) of 3-methacryloxypropyl tris (trimethylsiloxy) silane prepared in Reference Example 1 and expressed by the following formula: $CH_2$=CMe-COO—$C_3H_6$—Si $(OSiMe_3)_3$ (where Me is a methyl group), and 0.05 g of 2,2'-azobis-2-methylbutyronitrile was added dropwise during 1 hour. Upon completion of the addition operation, the solution obtained by dissolving 0.007 g of 2,2'-azobis-2-methylbutyronitrile in 5 g of toluene was added (so that the total amount of 2,2'-azobis-2-methylbutyronitrile became equal to 0.057 g=0.3 millimole), the components were mixed for 3 hours at 90 to 100° C., and a radical-polymerization reaction was conducted to form a methacrylic-type copolymer. The latter was further combined with 10 g of methanol, and the obtained methanol copolymer solution was diluted with toluene until the concentration of the non-volatile fraction in the obtained copolymer solution became equal to 20 wt. %. The obtained methacrylic-type copolymer had a weight-average molecular weight exceeding 100,000. 70 g (20% non-volatile fraction) of the methacrylic copolymer solution was held for 3 months at room temperature, the solution was gelled and showed insufficient storage stability.

Comparative Example 3

A flask equipped with a stirrer was loaded with 70 g of toluene, and the contents were heated to 90° C. in a flow of gaseous nitrogen. Following this, a mixture composed of 21 g (210 millimoles) of methylmethacrylate, 21 g (85 millimoles) of 3-methacryloxypropyl-trimethoxysilane, 4.2 g (10 millimoles) of 3-methacryloxypropyl tris (trimethylsiloxy) silane prepared in Reference Example 1 and expressed by the following formula: $CH_2$=CMe-COO—$C_3H_6$—Si$(OSiMe_3)_3$ (where Me is a methyl group), and 3.8 g of 2,2'-azobis-2-methylbutyronitrile was added dropwise during 1 hour. Upon completion of the addition operation, the solution obtained by dissolving 0.2 g of 2,2'-azobis-2-methylbutyronitrile in 5 g of toluene was added (so that the total amount of 2,2'-azobis-2-methylbutyronitrile became equal to 4 g=20.8 millimoles), the components were mixed for 3 hours at 90 to 100° C., and a radical-polymerization reaction was conducted to form a methacrylic-type copolymer. The obtained methacrylate-type copolymer had a weight-average molecular weight equal to 2,000. The latter was further combined with 10 g of methanol, and the obtained methanol copolymer solution was diluted with toluene until concentration of the non-volatile fraction in the obtained copolymer solution became equal to 20 wt. %. The obtained methacrylic-type copolymer (20% non-volatile fraction) was mixed with 30 g of toluene and 0.3 g of tetrabutyltitanate to form a coating agent composition. ). The obtained coating agent composition was applied by flow coating onto the surface of a stainless-steel substrate, and the unit was heated for 30 min. at 180° C. to form a cured transparent coating film. The cured coating film was non-uniform because of ripples and had poor coatability.

Comparative Example 4

A flask equipped with a stirrer was loaded with 70 g of toluene, and the contents were heated to 90° C. in a flow of gaseous nitrogen. Following this, a mixture composed of 21 g (210 millimoles) of methylmethacrylate, 21 g (85 millimoles) of 3-methacryloxypropyl-trimethoxysilane, 0.5 g (1.2 millimoles) of 3-methacryloxypropyl tris. (trimethylsiloxy) silane prepared in Reference Example 1 and expressed by the following formula: $CH_2$=CMe-COO—$C_3H_6$—Si$(OSiMe_3)_3$ (where Me is a methyl group), and 18 g of 2,2'-azobis-2-methylbutyronitrile was added dropwise during 1 hour. Upon completion of the addition operation, the solution obtained by dissolving 0.2 g of 2,2'-azobis-2-methylbutyronitrile in 5 g of toluene was added (so that the total amount of 2,2'-azobis-2-methylbutyronitrile became equal to 0.2 g=1 millimole), the components were mixed for 3 hours at 90 to 100° C., and a radical-polymerization reaction was conducted to form a methacrylic-type copolymer. The obtained methacrylate-type copolymer had a weight-average molecular weight equal to 22,000. The latter was further combined with 10 g of methanol, and the obtained methanol copolymer solution was diluted with toluene until the concentration of the non-volatile fraction in the obtained copolymer solution became equal to 20 wt. %. The obtained methacrylic-type copolymer was mixed with 0.3 g of tetrabutyltitanate to form a coating agent composition. The obtained coating agent composition was applied by flow coating onto the surface of a stainless-steel substrate, and the composition was cured for 1 hour at 200° C.

to form a cured transparent coating film. The cured coating film had contact angle with water equal to 80° and had poor water-repellency.

Comparative Example 5

A flask equipped with a stirrer was loaded with 70 g of toluene, and the contents were heated to 90° C. in a flow of gaseous nitrogen. Following this, a mixture composed of 21 g (210 millimoles) of methylmethacrylate, 21 g (85 millimoles) of 3-methacryloxypropyl-trimethoxysilane, 41 g (97 millimoles) of 3-methacryloxypropyl tris (trimethylsiloxy) silane prepared in Reference Example 1 and expressed by the following formula: $CH_2=CMe-COO-C_3H_6-Si(OSiMe_3)_3$ (where Me is a methyl group), and 18 g of 2,2'-azobis-2-methylbutyronitrile, and 18 g of 2,2'-azobis-2-methylbutyronitrile was added dropwise during 1 hour. Upon completion of the addition operation, the solution obtained by dissolving 0.2 g of 2,2'-azobis-2-methylbutyronitrile in 5 g of toluene was added (so that the total amount of 2,2'-azobis-2-methylbutyronitrile became equal to 0.2 g=1 millimole), the components were mixed for 3 hours at 90 to 100° C., and a radical-polymerization reaction was conducted to form a methacrylic-type copolymer. The obtained methacrylate-type copolymer had a weight-average molecular weight equal to 250,000. The latter was further combined with 10 g of methanol, and the obtained methanol copolymer solution was diluted with toluene until the concentration of the non-volatile fraction in the obtained copolymer solution became equal to 20 wt. %. The obtained methacrylic-type copolymer was mixed with 0.3 g of tetrabutyltitanate to form a coating agent composition. The obtained coating agent composition was applied by flow coating onto the surface of a stainless-steel substrate, and the composition was cured for 1 hour at 200° C. to form a cured transparent coating film. The cured coating film had pencil hardness of B category and had low strength. 10 scratches with No. 0000 Bonstar Steel Wool of Nippon Steel Wool Co., Ltd. caused whitening on the surface of the coating film.

INDUSTRIAL APPLICABILITY

The coating agent composition of the present invention possesses excellent coatability prior to curing, can be rapidly cured, and after curing forms a transparent coating film of high hardness that is characterized by excellent water-repellency, durability and firm adhesion to various substrate. In view of the above properties, the composition is suitable for use as a coating agent for coating substrates made from metal, inorganic, or other materials. It is especially advantageous to use the coating agent composition of the invention for surface coating of fine metal and metal-oxide powders. Furthermore, the composition is suitable for use as a coating agent in conjunctions with structural materials, road-building materials, vehicles, rail-road cars, airplanes, ships, electric devices, electronic devices, etc.

The invention claimed is:

1. A coating agent composition comprising:
(A) 100 parts by weight of an acrylic copolymer that has a weight-average molecular weight within the range of 3,000 to 100,000 and is obtained by radical-polymerization of the following constituents consisting essentially of:
(A1) 100 parts by weight of a silane compound represented by the following general formula (1):

$$CH_2=C(R^1)-COO-Q-SiR^2_n(OR^3)_{3-n} \quad (1)$$

(where $R^1$ is a hydrogen atom or a methyl group, Q is a bivalent aliphatic hydrocarbon group with 2 to 6 carbon atoms, $R^2$ is a non-substituted or substituted univalent hydrocarbon group having 1 to 8 carbon atoms, $R^3$ is an aliphatic hydrocarbon group having 1 to 4 carbon atoms, and n is an integer from 0 to 2);
(A2) 80 to 150 parts by weight of one or more vinyl-polymerizable compounds with unsaturated bonds selected from the group consisting of alkylmethacrylate, methylacrylate, ethylacrylate, butylacrylate, 2-(dimethylamino) ethylmethacrylate, 2-(dimethylamino) ethylacrylate, 3-(dimethylamino) propylmethacrylate, 3(dimethylamino) propylacrylate, 2-(diethylamino) ethylmethacrylate, 2-(diethylamino) ethylacrylate, vinyl acetate, methylvinylether, ethylvinylether, methylvinylketone, ethylvinylketone, styrene, β-methylstyrene, p-methylstyrene, and combinations thereof;
(A3) 10 to 50 parts by weight of a siloxysilane compound represented by the following general formula (2):

$$CH_2=C(R^1)-COO-Q-Si(OSiR^4_3)_3- \quad (2)$$

(where $R^1$ and Q are the same as defined above, and $R^4$ is an alkyl group with 1 to 4 carbon atoms); and
(B) a catalytic quantity of a condensation-reaction accelerating catalyst.

2. The coating agent composition of claim 1, further comprising (C) an organic solvent in an amount sufficient for dissolving component (A).

3. The coating agent composition according to claim 2, further comprising (D) an aminosilane coupling agent in the amount of 0.1 to 10 parts by weight per 100parts of component (A).

4. The coating agent composition of claim 3, wherein said component (D) is selected from the group consisting of 3-aminopropyltriethoxysilane, 3-aminopropyl-trimethoxysilane, 3-aminopropylmethyldiethoxysilane, 3-aminopropylmethyl-dimethoxysilane, 3-(2-aminoethyl) aminopropyltrimethoxysilane, 3-(2-aminoethyl) aminopropylmethyldimethoxysilane, and 3-anilinopropyltrimethoxysilane.

5. The coating agent composition according to claim 2, wherein said component (A) comprises an acrylic copolymer obtained by copolymerization with participation of an azo compound used in the amount of 0.3 to 0.99 mole per 100 moles of the sum of constituents (A1), (A2), and (A3).

6. The coating agent composition according to claim 2, wherein said constituent (A2) is an alkylmethacrylate.

7. The coating agent composition according to claim 6 that provides a cured coating film having pencil hardness at least 4H.

8. The coating agent composition according to claim 2, wherein said constituent (A1) is selected from the group consisting of 3-methacryloxypropyltrimethoxysilane, 3-acryloxypropyltrimethoxysilane, 3-methacryloxypropyltriethoxysilane, 3-acryloxypropyltriethoxysilane, and 3-methacryloxypropylmethyldimethoxysilane, and 3-methacryloxypropyl-methyldiethoxysilane.

9. The coating agent composition according to claim 2, wherein said component (B) is selected from the group consisting of an organotitanium compound, organozirconium compound, and organoaluminum compound.

10. The coating agent composition according to claim 1, further comprising (D) an aminosilane coupling agent in the amount of 0.1 to 10 parts by weight per 100parts of component (A).

11. The coating agent composition of claim 10, wherein said component (D) is selected from the group consisting of 3-aminopropyltriethoxysilane, 3-aminopropyl-trimethoxysilane, 3-aminopropylmethyldiethoxysilane, 3-aminopropylmethyl-dimethoxy, 3-(2-aminoethyl) aminopropyltrimethoxysilane, 3-(2-aminoethyl) aminopropylmethyldimethoxysilane, and 3-anilinopropyltrimethoxysilane.

12. The coating agent composition according to claim 10, wherein said component (A) comprises an acrylic copolymer obtained by copolymerization with participation of an azo compound used in the amount of 0.3 to 0.99 mole per 100 moles of the sum of constituents (A1), (A2), and (A3).

13. The coating agent composition according to claim 10, wherein said constituent (A2) is an alkylmethacrylate.

14. The coating agent composition according to claim 13 that provides a cured coating film having pencil hardness at least 4H.

15. The coating agent composition according to claim 10, wherein said constituent (A1) is selected from the group consisting of 3-methacryloxypropyltrimethoxysilane, 3-acryloxypropyltrimethoxysilane, 3-methacryloxypropyltriethoxysilane, 3-acryloxypropyltriethoxysilane, and 3-methacryloxypropylmethyldimethoxysilane, and 3-methacryloxypropyl-methyldiethoxysilane.

16. The coating agent composition according to claim 10, wherein said component (B) is selected from the group consisting of an organotitanium compound, organozirconium compound, and organoaluminum compound.

17. The coating agent composition according to claim 1, wherein said component (A) comprises an acrylic copolymer obtained by copolymerization with participation of an azo compound used in the amount of 0.3 to 0.99 mole per 100 moles of the sum of constituents (A1), (A2), and (A3).

18. The coating agent composition according to claim 1, wherein said constituent (A2) is an alkylmethacrylate.

19. The coating agent composition according to claim 18 that provides a cured coating film having pencil hardness at least 4H.

20. The coating agent composition according to claim 1, wherein said constituent (A1) is selected from the group consisting of 3-methacryloxypropyltrimethoxysilane, 3-acryloxypropyltrimethoxysilane, 3-methacryloxypropyltriethoxysilane, 3-acryloxypropyltriethoxysilane, and 3-methacryloxypropylmethyldimethoxysilane, and 3-methacryloxypropyl -methyldiethoxysilane.

21. The coating agent composition according to claim 1, wherein said component (B) is selected from the group consisting of an organotitanium compound, organozirconium compound, and organoaluminum compound.

* * * * *

UNITED STATES PATENT AND TRADEMARK OFFICE
CERTIFICATE OF CORRECTION

PATENT NO. : 7,795,360 B2
APPLICATION NO. : 10/562656
DATED : September 14, 2010
INVENTOR(S) : Toru Masatomi et al.

It is certified that error appears in the above-identified patent and that said Letters Patent is hereby corrected as shown below:

ON THE TITLE PAGE; ITEM (75):

Front Page, Inventors, after "Masatomi", please delete "Chiba Prefecture" and replace with -- Ichihara-shi --

Front Page, Inventors, after "Sasaki", please delete "Chiba Prefecture" and replace with -- Ichihara-shi --

Front Page, Inventors, after "Kobayashi", please delete "Chiba Prefecture" and replace with -- Ichihara-shi --

IN THE CLAIMS:

Column 12, line 23, please delete "$CH_2 = C(R^1) – COO – Q – Si(0SiR^4_3)_3.$" and replace with -- $CH_2 = C(R^1) – COO – Q – Si(OSiR^4_3)_3.$ --

Column 12, line 33, please delete "100parts" and replace with -- 100 parts --

Column 12, line 66, please delete "100parts" and replace with -- 100 parts --

Column 13, line 4 through 5, please delete "3-aminopropylmethyl-dimethoxy" and replace with -- 3-aminopropylmethyl-dimethoxysilane --

Signed and Sealed this
Fifteenth Day of March, 2011

David J. Kappos
*Director of the United States Patent and Trademark Office*